United States Patent

Saito et al.

[11] Patent Number: 5,909,428
[45] Date of Patent: Jun. 1, 1999

[54] SHORT CELL MANAGEMENT UNIT AND METHOD

[75] Inventors: Yukichi Saito, Higashiyamato; Motoshi Tamura; Hiroshi Nakamura, both of Tokyo, all of Japan

[73] Assignee: NTT Mobile Communications Network, Inc., Japan

[21] Appl. No.: 08/877,936

[22] Filed: Jun. 18, 1997

[30] Foreign Application Priority Data

Jun. 20, 1996 [JP] Japan .................................. 8-160274
May 27, 1997 [JP] Japan .................................. 9-136760

[51] Int. Cl.$^6$ .................................................. H04L 12/56
[52] U.S. Cl. ........................................ 370/244; 370/470
[58] Field of Search .................................. 370/465, 466, 370/470, 472, 395, 476, 522, 528, 474, 242, 244, 249, 250, 410

[56] References Cited

U.S. PATENT DOCUMENTS

| | | | |
|---|---|---|---|
| 4,999,835 | 3/1991 | Lagoutte | 370/395 |
| 5,301,189 | 4/1994 | Schmidt | 370/60.1 |
| 5,461,607 | 10/1995 | Miyagi | 370/16 |
| 5,742,610 | 4/1998 | Natarajan | 370/472 |

OTHER PUBLICATIONS

"Operation and Maintenance functions for layered cell method in mobile ATM networks" by Yukichi Saito, Motoshi Tamura and Hiroshi Nakamura, NTT Mobile Communications Network, Inc. at The 1996 Communications Society Conference of IEICE, Kanazawa University, Kanazawa, Japan on Sep. 18–21, 1997.

Primary Examiner—Chau Nguyen
Assistant Examiner—Thinh Vu
Attorney, Agent, or Firm—Rogers & Wells LLP

[57] ABSTRACT

A short cell management unit capable of carrying out OAM (operation, administration and maintenance) functions on short cell connection basis (newly defined F7 flow) included in VC (virtual connection) in addition to OAM functions on VC basis (F5 flow) which are defined in a conventional B-ISDN. The F7 flow includes the entire OAM functions such as fault management, performance management, which are included in F4 and F5 flows that carry out the management by causing a standard OAM cell defined in the existing B-ISDN to flow. To implement this, a variable length OAM cell is newly provided as one of the short cells, and a base station and a switching office are newly provided with a short OAM cell/standard OAM cell translator for carrying out mapping between the short OAM cell and the standard OAM cell. Furthermore, a generally used standard OAM processor is used for implementing the management functions (F4 and F5 flow) defined in the standard B-ISDN.

5 Claims, 20 Drawing Sheets

OAM FUNCTIONAL CONFIGURATION IN SHORT CELL TERMINAL UNIT

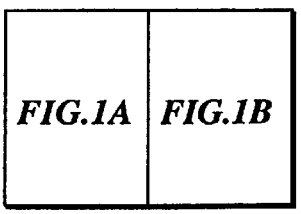
FIG.1
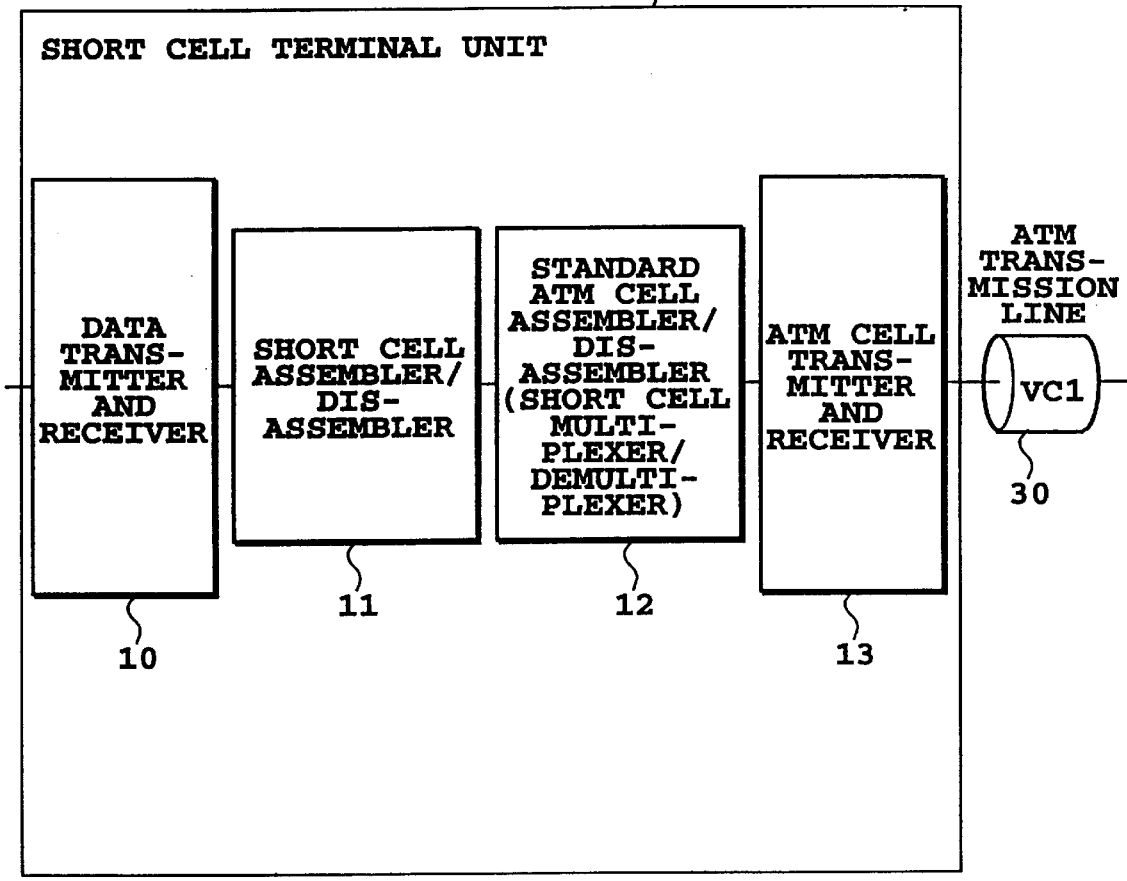
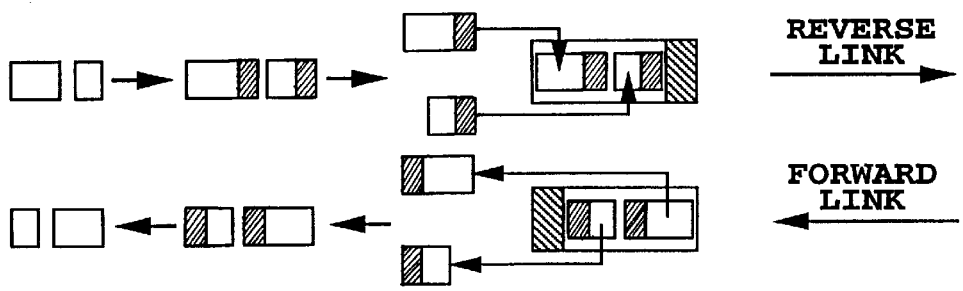
SHORT CELL MULTIPLEX TRANSMISSION
BETWEEN SHORT CELL TERMINAL UNITS
*FIG.1A*

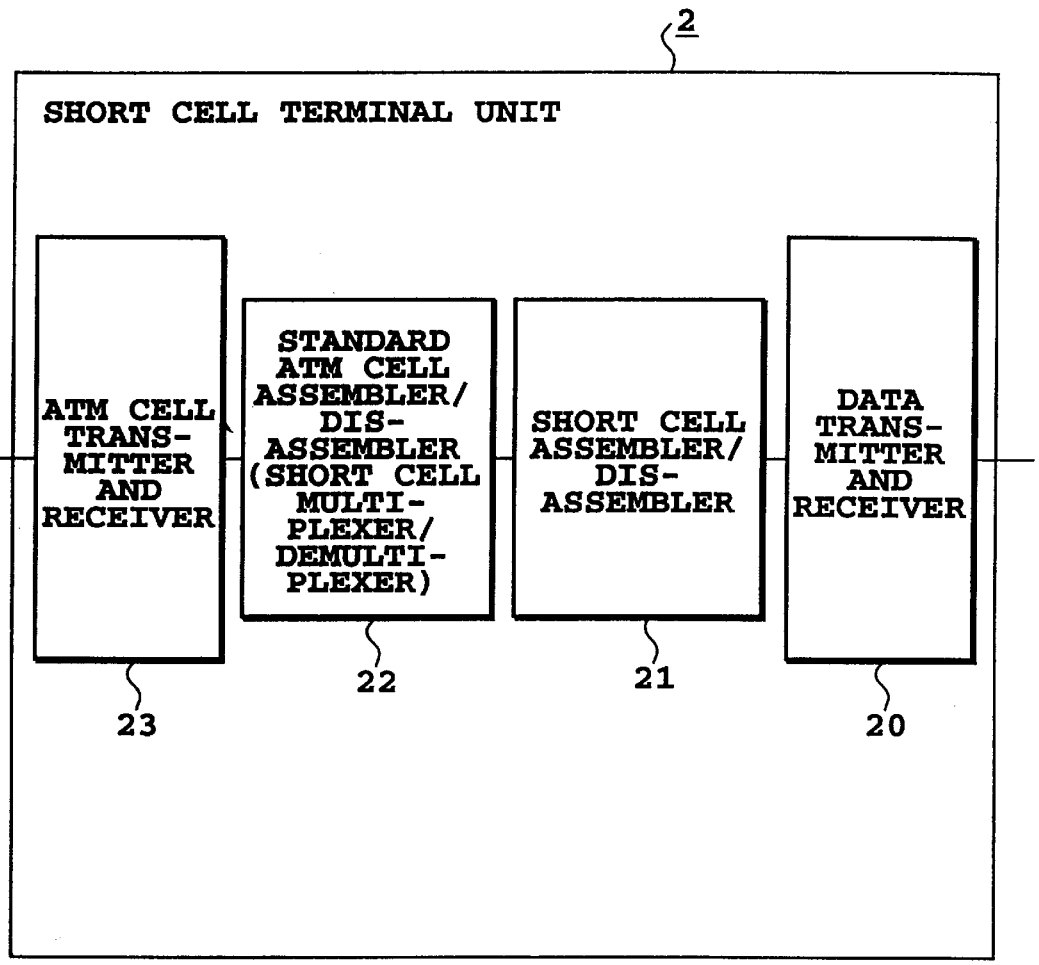
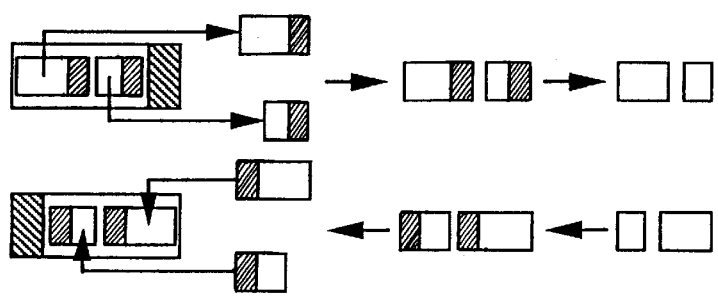
FIG.1B

OAM FUNCTIONAL CONFIGURATION IN SHORT CELL TERMINAL UNIT

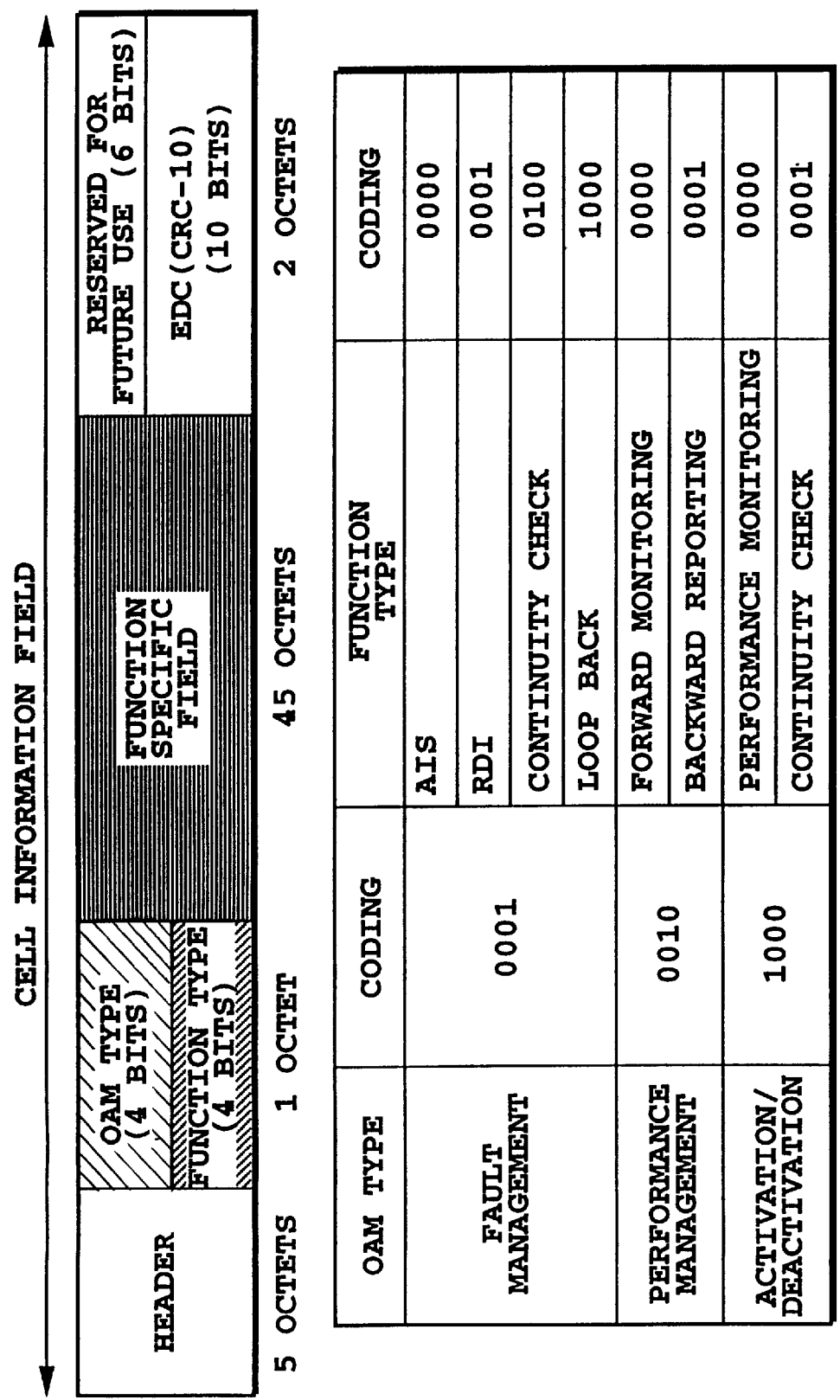
FIG.3  STANDARD OAM CELL INFORMATION FIELD

AIS, RDI FUNCTION IDENTIFYING FIELD

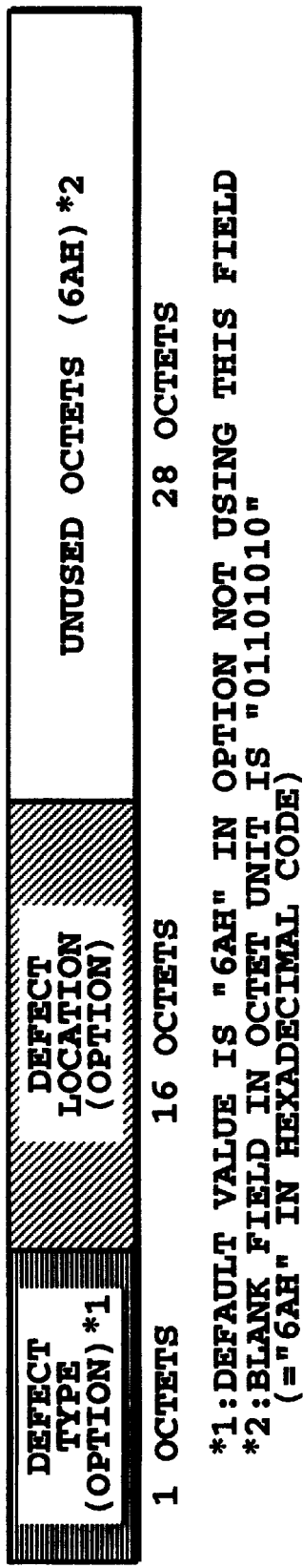

| DEFECT TYPE (OPTION) *1 | DEFECT LOCATION (OPTION) | UNUSED OCTETS (6AH) *2 |
|---|---|---|
| 1 OCTETS | 16 OCTETS | 28 OCTETS |

*1: DEFAULT VALUE IS "6AH" IN OPTION NOT USING THIS FIELD
*2: BLANK FIELD IN OCTET UNIT IS "01101010" (="6AH" IN HEXADECIMAL CODE)

FIG.4A

CONTINUITY CHECK FUNCTION IDENTIFYING FIELD

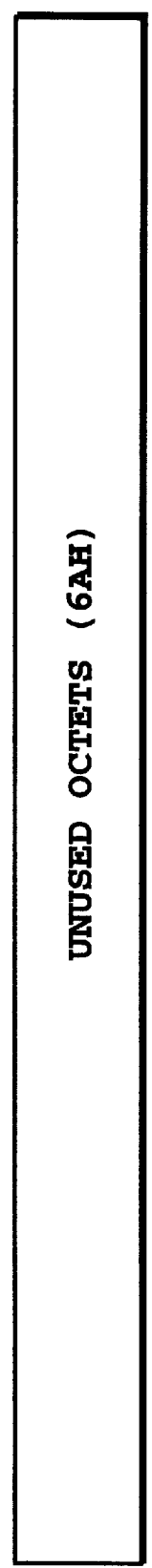

| UNUSED OCTETS (6AH) |
|---|
| 48 OCTETS |

6AHS ARE FILLED OUT BECAUSE CONTINUITY CHECK HAS NO FUNCTION SPECIFIC FIELD

FIG.4B

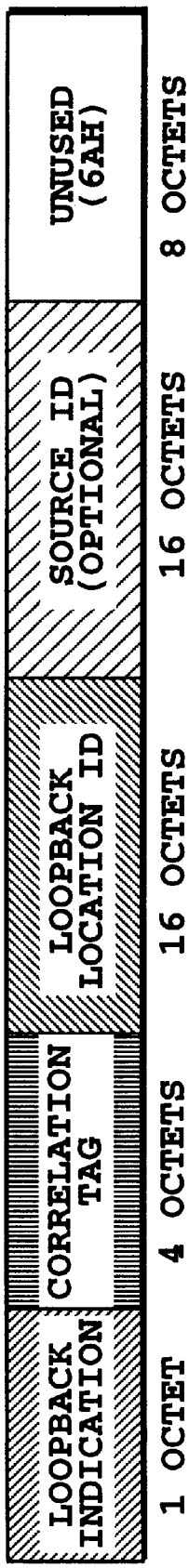

| FIELD NAME | CONTENTS |
|---|---|
| LOOPBACK INDICATION | INDICATE WHETHER RECEIVED LOOP BACK CELL IS LOOPED BACK OR NOT. |
| CORRELATION TAG | TAG FOR RELATING TRANSMITTED REQUEST CELL TO RECEIVED RESPONSE CELL IN NODE PERFORMING START/STOP. |
| LOOPBACK LOCATION ID | INDICATING LOCATION OF LOOP BACK. |
| SOURCE ID | INDICATING NODE THAT HAS INSERTED LOOP BACK OAM CELL. |

LOOP BACK FUNCTION SPECIFIC FIELD

FIG.5

| MCSM | TUC 0+1 | BEDC 0+1 | TUC 0 | TSTP (OPTION) | UNUSED (6AH) | TRCC 0 | BLER 0+1 | TRCC 0+1 |
|---|---|---|---|---|---|---|---|---|
| 1 OCTET | 2 OCTETS | 2 OCTETS | 2 OCTETS | 4 OCTETS | 29 OCTETS | 2 OCTETS | 1 OCTET | 2 OCTETS |

EXTENDED TO MANAGE PERFORMANCE OF USER CELL FLOW OF CLP=0+1 AND CLP=0 AT THE SAME TIME

| FIELD NAMES | CONTENTS |
|---|---|
| MCSM | REPRESENT IN MODULO 256 SEQUENCE NUMBERS OF MONITORING CELLS FOR DETECTING THEIR LOSS/ ERRONEOUS INSERTION. |
| TUC | REPRESENT IN MODULO 65536 SEQUENCE NUMBERS OF USER CELLS FOR DETECTING THEIR LOSS/ ERRONEOUS INSERTION. |
| BEDC | TRANSFER 16-BIT EVEN PARITY CODE ASSOCIATED WITH ALL USER CELLS WHICH HAVE BEEN SENT AFTER IMMEDIATELY PREVIOUS MONITORING CELL, FOR DETECTING BIT ERROR OF USER CELL INFORMATION. |
| TSTP | INDICATE TIME AT WHICH OAM CELL IS INSERTED. |
| BLER | USED FOR NOTIFYING PARTY OF THE NUMBER OF BIT ERRORS DETECTED AT RECEIVING SIDE USING BEDC. |
| TRCC | USED FOR NOTIFYING TRANSMITTING SIDE OF THE TOTAL NUMBER OF USER CELLS RECEIVED AT RECEIVING SIDE. THIS INFORMATION IS USED AT TRANSMITTING SIDE FOR DETECTING LOSS/ERRONEOUS INSERTION OF CELLS. |

MONITORING FUNCTION SPECIFIC FIELD

*FIG.6*

| MESSAGE ID (6 BITS) | CORRELATION TAG | PERFORMANCE MONITORING BLOCK SIZE | UNUSED (6AH) |
|---|---|---|---|
| OPERATIONAL DIRECTION (2 BITS) | | (A-B)(4 BIT) (B-A)(4 BIT) | |
| 1 OCTET | 1 OCTET | 1 OCTET | 42 OCTETS |

| FIELD NAMES | CONTENTS |
|---|---|
| MESSAGE ID | REPRESENT, IN TERMS OF CODES, MESSAGES OF START REQUEST, START ACKNOWLEDGEMENT, START NEGATIVE ACKNOWLEDGEMENT, STOP REQUEST, STOP ACKNOWLEDGEMENT, STOP NEGATIVE ACKNOWLEDGEMENT. |
| OPERATIONAL DIRECTION | REPRESENT WHETHER DIRECTION OF OAM STARTING ACTION TO BE STARTED/STOPPED IS A-B, B-A OR BOTH. |
| CORRELATION TAG | CODES FOR RELATING TRANSMITTED REQUEST CELL TO RECEIVED RESPONSE CELL IN NODE PERFORMING START/STOP REQUEST. |
| PERFORMANCE MONITORING BLOCK SIZE(A-B) | REPRESENT MONITORING BLOCK SIZE OF A-B DIRECTION SELECTED BY STARTING SOURCE WHEN STARTING PERFORMANCE MONITORING FUNCTION, IN WHICH SIZES OF 128, 256, 512 AND 1024 CAN BE DESIGNATED. |
| PERFORMANCE MONITORING BLOCK SIZE(B-A) | REPRESENT MONITORING BLOCK SIZE OF B-A DIRECTION SELECTED BY STARTING SOURCE WHEN STARTING PERFORMANCE MONITORING FUNCTION, IN WHICH SIZES OF 128, 256, 512 AND 1024 CAN BE DESIGNATED. |

ACTIVATION/DEACTIVATION FUNCTION SPECIFIC FIELD

*FIG.7*

TRANSLATION RULE BETWEEN SHORT OAM CELL AND STANDARD OAM CELL

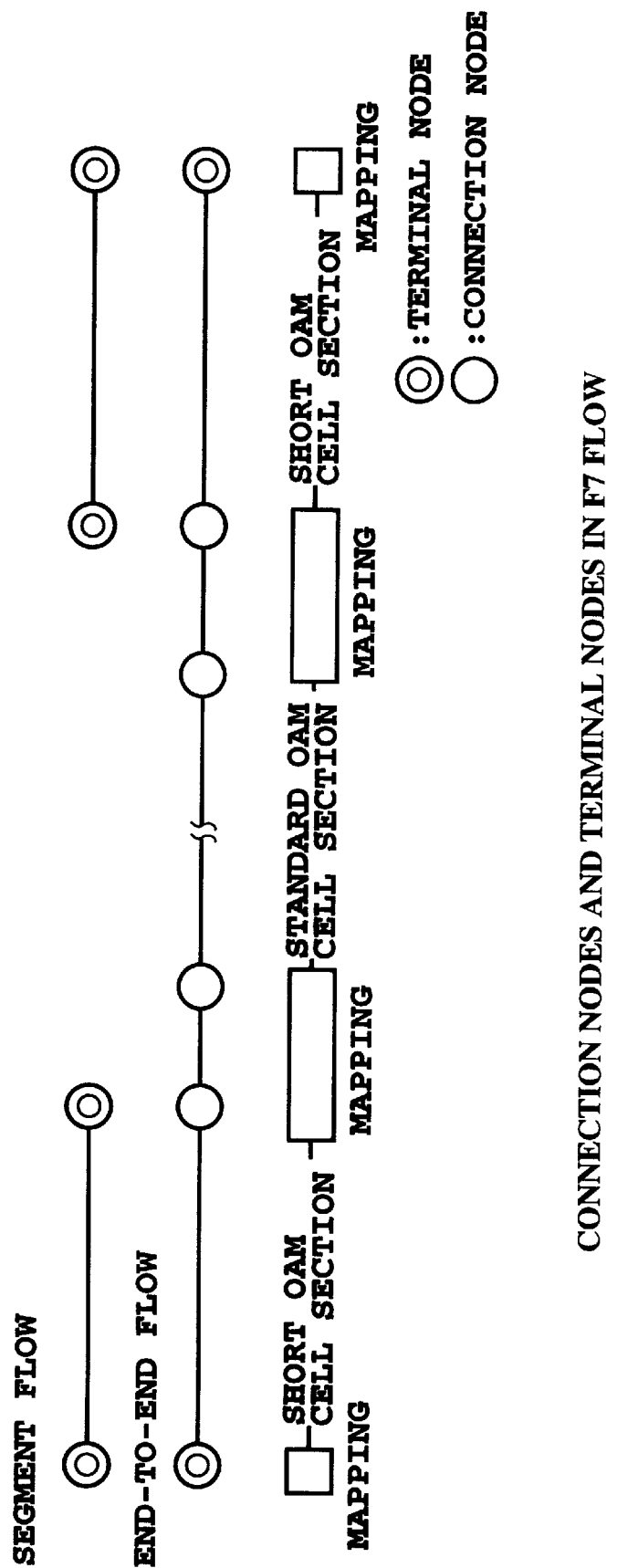
FIG.12 CONNECTION NODES AND TERMINAL NODES IN F7 FLOW

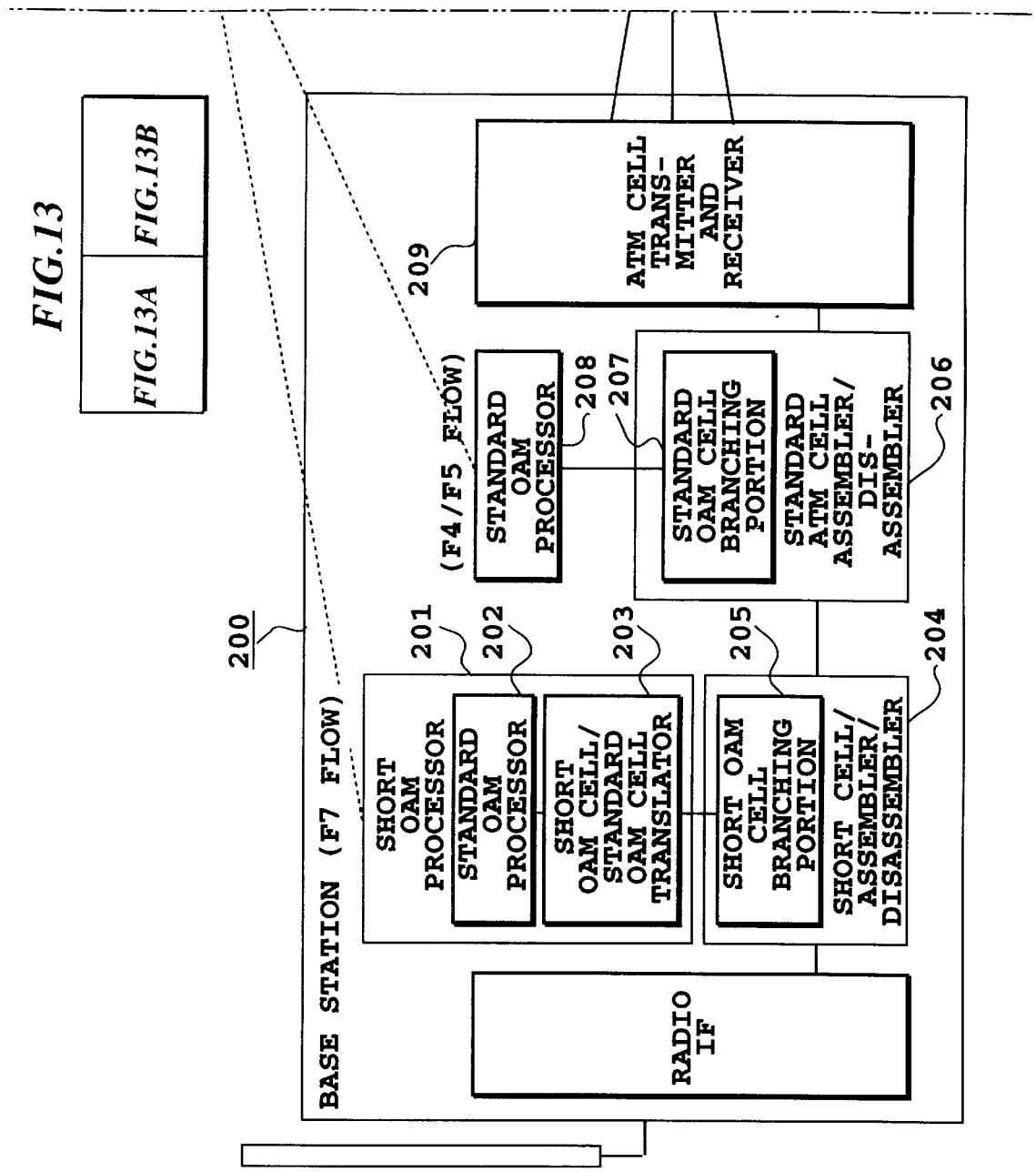

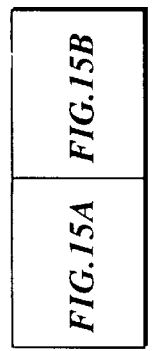
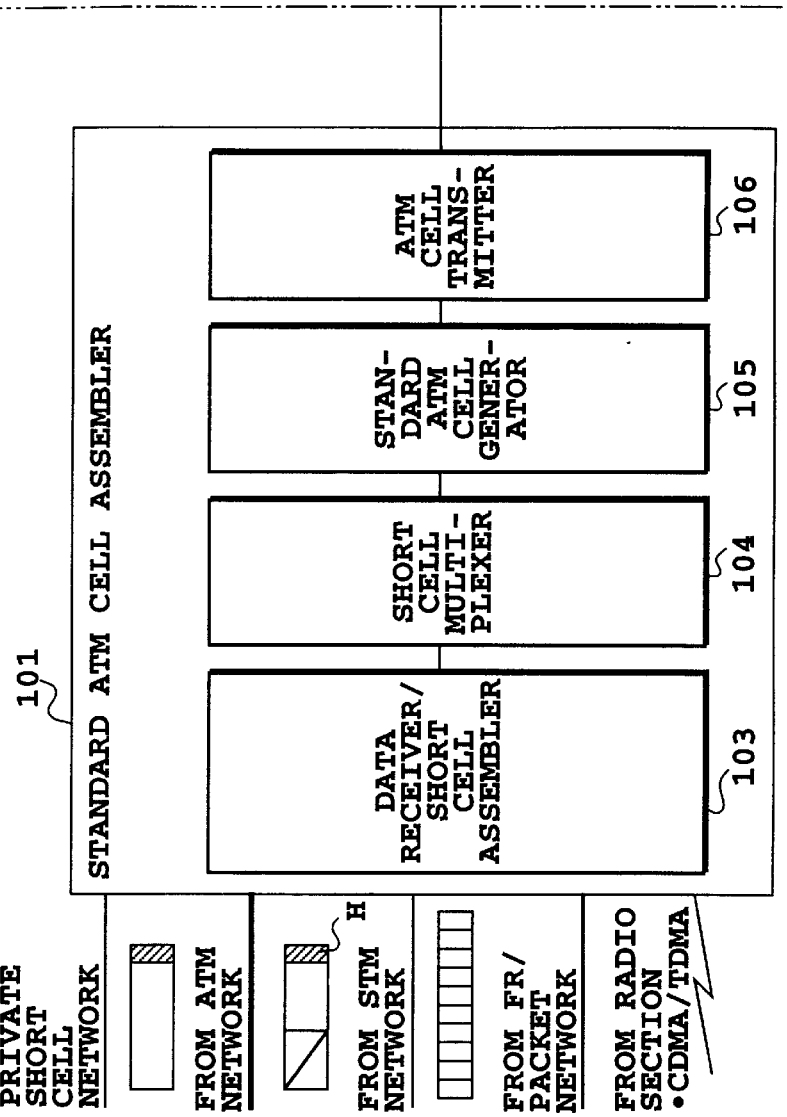
FIG.15A

SHORT CELL MANAGEMENT UNIT AND METHOD

BACKGROUND OF THE INVENTION

FIELD OF THE INVENTION

The present invention relates to a short cell management unit and method, and more particularly to a short cell management unit and method for managing a short cell terminal unit included in a short cell multiplex ATM transmission system for transmitting a plurality of the short cells multiplexed in the payload of a standard ATM cell.

DESCRIPTION OF RELATED ART

When converting highly real time information such as voice into ATM cells at a low bit rate, storing information into the payload of a standard ATM cell until it is filled will increase delay, thereby resulting in degradation in information quality. To prevent this, a partial fill method has been proposed which places information only partially in the payload of the ATM cell.

In addition, a short cell method has been proposed using short cells with a payload shorter than 48 octets of a standard ATM cell to handle low bit rate data in a local environment such as on premises.

FIGS. 14A and 14B show the partial fill method and short cell method, respectively.

The partial fill method as shown in FIG. 14A has a partial fill cell assembler 92 which adds to input data dummy data for the partial fill to complete a standard ATM cell, and outputs it to a B-ISDN network. A partial fill cell disassembler 93 extracts the data from the partial fill cell received from the B-ISDN network, and outputs the data.

The short cell method as shown in FIG. 14B has a short cell assembler 94 which forms a cell matching the input data length, and outputs the cell to a private network with a unique cell slot structure. A short cell disassembler 95 extracts the data from the short cell received from the private network, and outputs the data.

The partial fill method, however, has a problem in that the efficiency of the payload of the standard ATM cell is reduced because only part of the payload is used, thereby resulting in reduction in the transmission efficiency.

The short cell method, on the other hand, has a problem in that it requires the private network with a unique cell slot structure, which will complicate the matching with a standard ATM switching network (B-ISDN network).

In view of these problems, the applicant of the present invention has proposed, in Japanese patent application No. 8-52169, a short cell multiplexing method with high transmission efficiency and good matching property to the standard ATM transmission system, which mainly transmits short cells shorter than the payload of the standard ATM cell whose data length is basically 48 octets or less, though allowing beyond 48 octets. FIGS. 15A and 15B are a block diagram showing an example of such a short cell multiplexing method. In FIGS. 15A and 15B, a standard ATM cell assembler 101 converts various types of input information into short cells, places the short cells in a standard ATM cell considering the information length of the input information, and outputs the standard ATM cell to a B-ISDN network 107. A standard ATM cell disassembler 102 disassembles the standard ATM cell assembled by the standard ATM cell fed from the B-ISDN network 107 and assembler 101 into short cells, converts the short cells into the forms of the original input information, and outputs it to respective channels. With this arrangement, a short cell ATM cell multiplexing can be achieved which has high transmission efficiency with short delay, and matches well to the standard ATM system.

In the short cell multiplexing transmission system, however, a plurality of short cell connections are multiplexed in a single virtual connection (VC) between short cell terminal units.

In connection with this, although the OAM (Operation, Administration and Maintenance) functions defined in the conventional B-ISDN can achieve management on the VC basis (F5 flow), the management on the basis of the short cell connections included in the VC is impossible because no OAM functions are defined on the short cell connection basis.

Where the management on the short cell connection basis is impossible, the management on the end user basis corresponding to the short cell connection is also impossible. Incidentally, the current B-ISDN defines the OAM functions such as fault detection, connection test, speech quality monitor, etc. as the contents of the management.

SUMMARY OF THE INVENTION

It is therefore an object of the present invention to provide a short cell management unit and method capable of achieving the OAM functions on the short cell connection basis which were impossible in the conventional technique.

Another object of the present invention is to provide a short cell management unit and method capable of implementing the end-to-end OAM management that can easily match the standard ATM network having the standard OAM functions mounted, where the term "end" refers to a base station in the case of a mobile network.

According to the first aspect of the present invention, a short cell management unit in a short cell terminal unit included in a short cell multiplexing ATM transmission system which transmits a plurality of short cells multiplexed in a payload of a standard ATM cell, the short cell management unit comprises:

a short OAM cell branching portion for identifying a short OAM cell; and a short OAM processor operating in response to an output of the short OAM cell branching portion, wherein the short OAM processor includes:

a standard OAM processor for carrying out general functions; and a translator for carrying out translation between the short OAM cell and a standard OAM cell.

In the short cell management unit, the short cell multiplexing ATM system may further comprise an OAM function supervisor which transmits an OAM management command to the short OAM processor.

According to the second aspect of the present invention, a short cell management method comprises, when carrying out short cell transmission by multiplexing a plurality of short cells in a payload of a standard ATM cell:

a first step of identifying a short OAM cell among the short cells with an OAM identifier included in at least one of the short cells, to branch the short OAM cell to a short OAM processor; and a second step of carrying out an OAM cell processing on the received short OAM cell by the short OAM processor.

In the short cell management method, the second step may comprise the steps of:

translating the short OAM cell received by the short OAM processor into a standard OAM cell using a predetermined translation rule; and carrying out an OAM processing by analyzing the standard OAM cell as a standard OAM cell.

According to the present invention, the management on the basis of the short cell connections multiplexed into a single virtual connection (VC) in an ATM short cell multiplex transmission section is defined as F7 flow. The F7 flow includes the entire OAM functions included in the F4 and F5 flows defined in the existing B-ISDN. To implement the F7 flow, the present invention is newly provided with variable length OAM cells for the short cells (see, FIG. 8).

In addition, as a functional structure, the present invention can be provided as shown in FIG. 2 with a short OAM cell branching portion 11A in a short cell assembler/disassembler 11, a short OAM processor 14 in a short cell terminal unit 1, and a short OAM cell/standard OAM cell translator 14B for mapping of the short OAM cell and the standard QAM cell and a standard OAM processor 14A for processing a standard OAM cell in the short OAM processor 14. The OAM functions are executed in accordance with commands sent from an OAM function supervisor 40, and independent alarms or the like the unit generates are sent to the OAM function supervisor 40.

Thus, according to the present invention, the OAM functions based on individual short cell connections become possible, which were impossible in the conventional technique. In addition, the end-to-end OAM management can be implemented which has good matching with the standard ATM network having the standard OAM functions mounted (see, FIGS. 11A, 11B and 12).

The above and other objects, effects, features and advantages of the present invention will become more apparent from the following description of the embodiments thereof taken in conjunction with the accompanying drawings.

BRIEF DESCRIPTION OF THE DRAWINGS

FIG. 1 is a diagram showing the relationship between FIGS. 1A and 1B.

FIG. 1A is a block diagram showing a short cell multiplex transmission system between short cell terminal units to which the present invention is applied;

FIG. 1B is a block diagram showing a short cell multiplex transmission system between short cell terminal units to which the present invention is applied;

FIG. 3 is a diagram illustrating a standard OAM cell information field;

FIG. 4A is a diagram illustrating an AIS and RDI function identifying field;

FIG. 4B is a diagram illustrating a continuity check function identifying field;

FIG. 5 is a diagram illustrating a loop back function identifying field;

FIG. 6 is a diagram illustrating a monitoring function identifying field;

FIG. 7 is a diagram illustrating a start/stop function identifying field;

FIG. 11 is a diagram showing the relationship between FIGS. 11A and 11B.

FIG. 12 is a diagram illustrating operation of the OAM cell associated with F7 flow;

FIG. 13 is a diagram showing the relationship between FIGS. 13A and 13B.

FIG. 13A is a block diagram illustrating a connection test to which the present invention is applied;

FIG. 15 is a diagram showing the relationship between FIGS. 15A and 15B.

FIG. 15A are a block diagram showing a short cell multiplex ATM transmission technique as a prerequisite of the present invention.

DETAILED DESCRIPTION OF PREFERRED EMBODIMENTS

Figure 2:
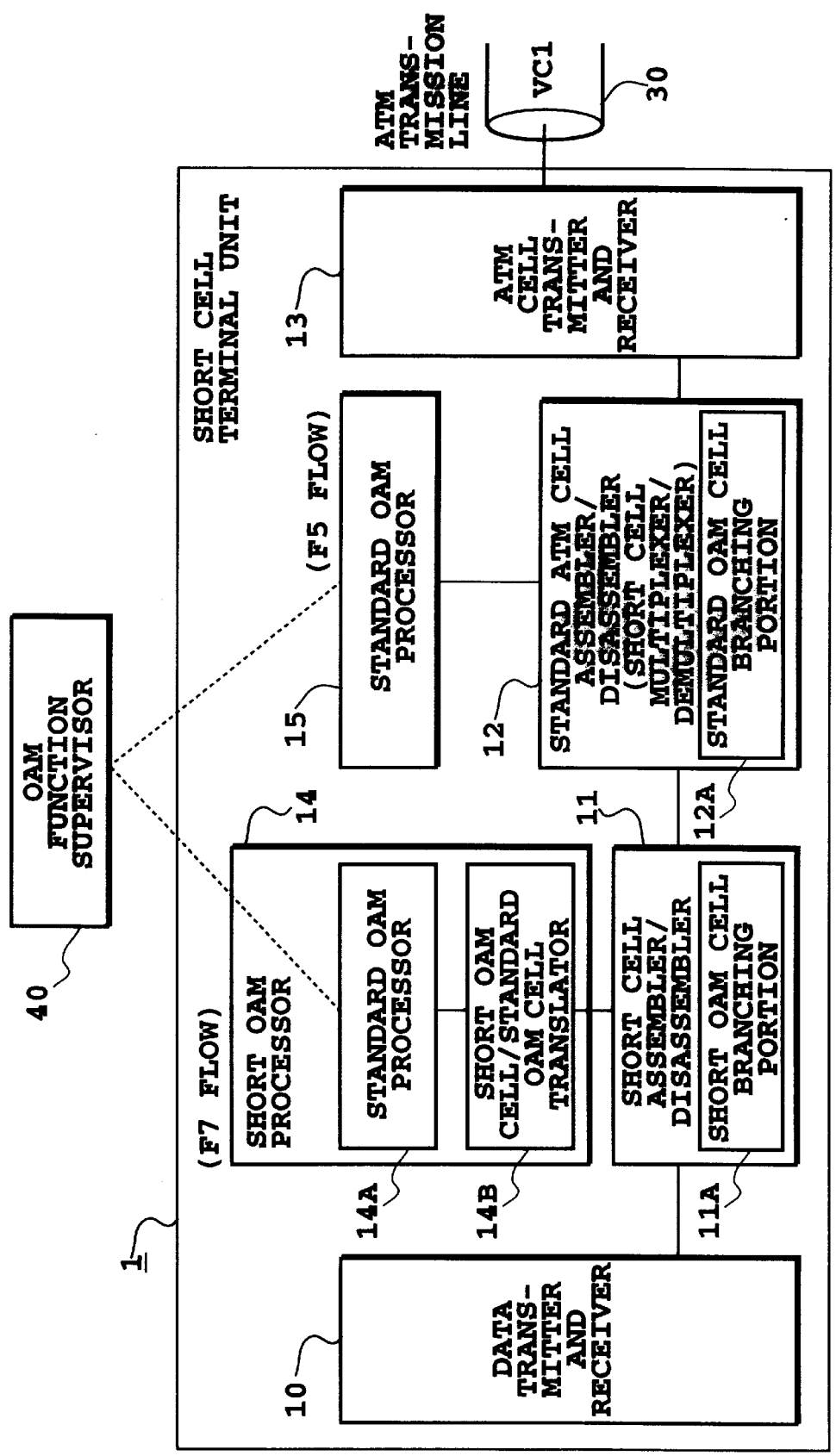
FIG. 2 is a block diagram showing details of an OAM functional structure in the short cell terminal unit as shown in FIG. 1.
Figure 8A:
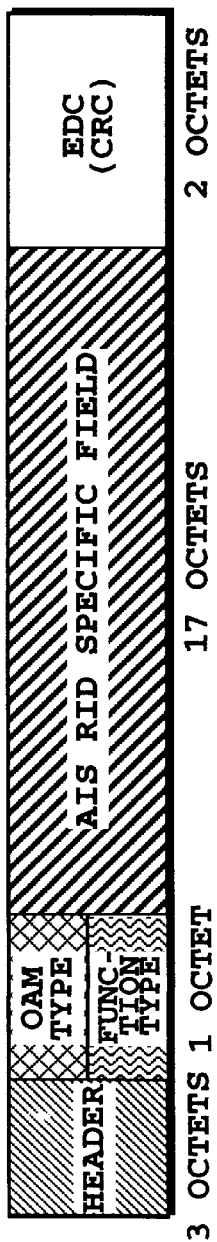
FIG. 8A is a diagram illustrating a short AIS and RID cell.
Figure 8B:
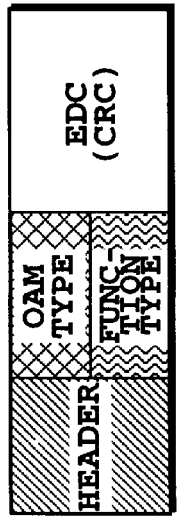
FIG. 8B is a diagram illustrating a short continuity check cell.
Figure 8C:
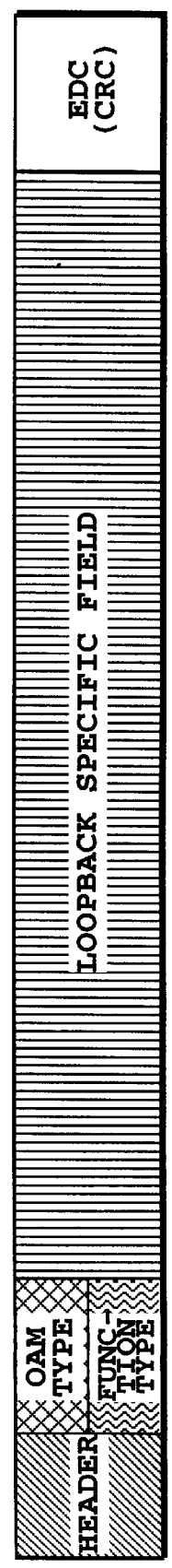
FIG. 8C is a diagram illustrating a short loop back cell.
Figure 8D:
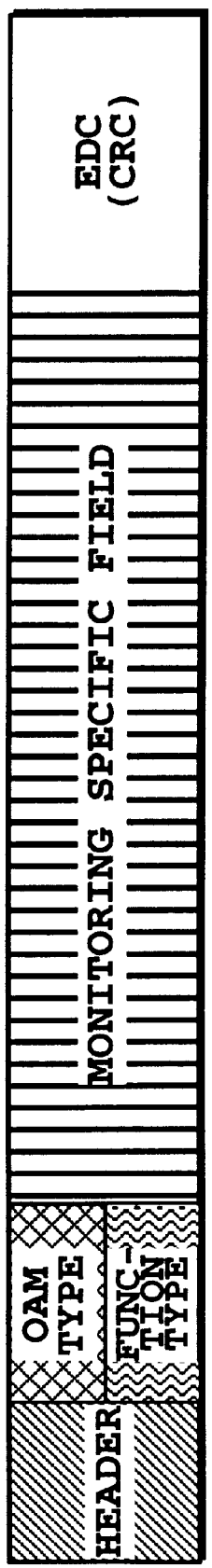
FIG. 8D is a diagram illustrating a short monitoring cell.
Figure 8E:
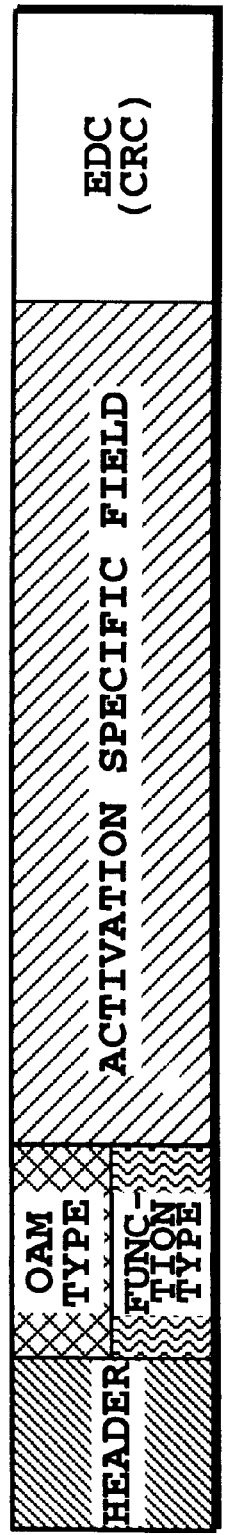
FIG. 8E is a diagram illustrating a short start/stop cell.

The invention will now be described with reference to the accompanying drawings.

An embodiment in accordance with the present invention newly defines F7 flow (which achieves management by causing a short OAM cell to flow for the management) for implementing the management on the short cell connection basis when transmitting short cells multiplexed in a single virtual connection (VC) in the ATM.

The F7 flow includes the entire OAM functions (such as fault management, performance management) in the F4 and F5 flows defined by the existing B-ISDN (which achieves the management by causing the standard OAM cell to flow).

To implement the new F7 flow, the present invention is provided with a variable length OAM cell for the short cell, and with a short OAM cell/standard OAM cell translator 14B for carrying out mapping of the short OAM cell and the standard OAM cell in the base station and a switching office. In addition, it employs a generally used standard OAM processor 15 for implementing the management functions (F4 and F5 flows) defined in the standard B-ISDN.

An embodiment in accordance with the present invention will now be described in detail referring to accompanying drawings.

FIGS. 1A and 1B show a general system configuration for implementing the short cell multiplex transmission between short cell terminal units 1 and 2. The configuration of the short cell terminal units 1 and 2 can be applied to the short cell multiplex transmission between a base station and a switching office in a mobile communications network.

The short cell terminal units 1 and 2 each include a data transmitter and receiver 10 or 20, a short cell assembler/ disassembler 11 or 21, a standard ATM cell assembler/ disassembler 12 or 22, and an ATM cell transmitter and receiver 13 or 23. The short cell assembler/disassembler 11 (21) forms a short packet from information fed by the data transmitter and receiver 10 (20), and provides the short cell with information such as a channel identifier, short cell length, packet payload type, user to user indication, header error control, as a header. The standard ATM cell assembler/ disassembler 12 (22) places multiplexed short cells in a single standard ATM cell, and provides it with a standard ATM header. The ATM cell transmitter and receiver 13 (23) sends the data to an ATM channel connected to the party short cell terminal unit 2 (1).

With this configuration in FIGS. 1A and 1B, in the reverse link, the short cell terminal unit 1 forms short cells from data fed from the data transmitter and receiver 10, and multiplexes the plurality of short cells in one or more standard ATM cells to transmits them to the short cell terminal unit 2. On the other hand, the short cell terminal unit 2 extracts the short cells from the multiplexed standard ATM cells, and recovers them into the data in accordance with original format. The procedure opposite to the above is carried out in the forward link.

The system as shown in FIG. 2 includes besides that of FIGS. 1A and 1B, a short OAM cell branching portion 11A, a standard OAM cell branching portion 12A, a short OAM processor 14, a standard OAM processor 15 and an OAM function supervisor 40, for carrying out the F5 flow (or F4 flow) and F7 flow.

The short cell terminal units 1 and 2 functioning as a transmitter side and a receiving side in the present embodiment are each provided with the generally used standard OAM processor 15 in the form of belonging to the standard ATM cell assembler/disassembler 12 for performing the OAM management according to the F5 flow (or F4 flow) defined by the standard B-ISDN. The short OAM processor 14 is also provided in the short cell terminal units 1 and 2 in a similar manner to carry out the management according to the F7 flow of the present invention.

The short OAM processor 14 includes a generally used standard OAM processor 14A (F7 flow) and a short OAM cell/standard OAM cell translator 14B to implement a novel function. In addition, the short cell assembler/disassembler 11 is provided with the short OAM cell branching portion 11A having a function (of identifying the short OAM cell) equivalent to that of the standard OAM cell branching portion 12A provided in the standard ATM cell assembler/ disassembler 12 for identifying the standard OAM cell in accordance with a payload type (PT) in the header of the standard ATM cell.

The OAM function supervisor 40 sends to the standard OAM processor 15 or short OAM processor 14 a start command of the OAM management such as connection test, performance test, so that the intended standard OAM cell can be inserted, extracted or monitored by the standard OAM processor 15 or short OAM processor 14. In addition, the OAM function supervisor 40 can receive alarms such as fault detection, performance degradation, from the standard OAM processor 15 which performs self-diagnosis for recognizing performance degradation by means of regular insertion and extraction of the cells.

FIGS. 3–7 are diagrams illustrating the information fields of the standard OAM cell defined by the B-ISDN. Three types of OAMs are prepared: the fault management, performance management and activation/deactivation. The fault management includes three types: fault detection by means of AIS (Alarm Indication Signal) or RDI (Remote Defect Indication); continuity check for the connection test; and loop back for fault location test. The performance management includes forward direction monitoring and reverse direction notification.

FIGS. 8A–8E are diagrams illustrating the information fields of the short OAM cell. In these examples, each cell includes a header consisting of three octets, an OAM type, a functional type, a function specific field and an EDC (Error Detection Code) (CRC-10) field. The function specific field is formed by removing the free octets from the standard OAM cell. This is to improve the transmission efficiency of the short cells by removing idle information as much as possible from the payload.

Figure 9:
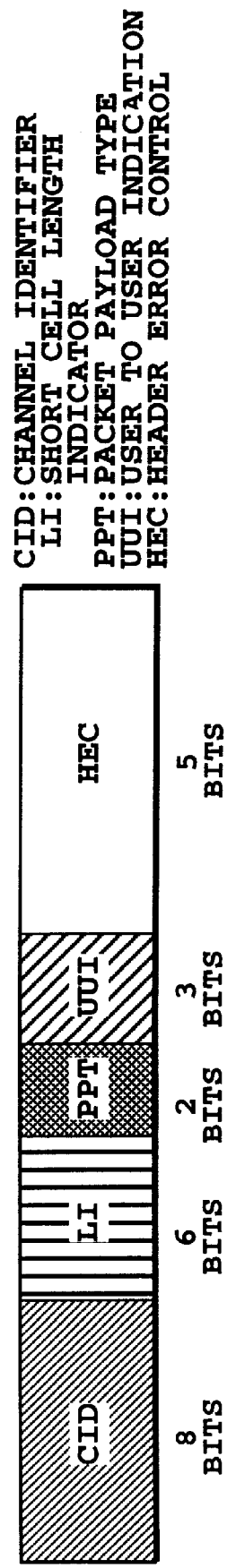
FIG. 9 is a diagram illustrating a short cell header.

FIG. 9 is a diagram illustrating an example of a header format of the short cell. The information in the short cell header includes a channel identifier (CID), a short cell length indicator (LI), a packet payload type (PPT), a user to user indication (UUI), and a header error control (HEC), which consist of eight bits, six bits, two bits, three bits and five bits, respectively.

Using the PPT and UUI in the short cell header makes it possible to decide whether the short cell is a user cell or an OAM cell, thereby enabling the short OAM branching portion 11A to branch the short cells.

Figure 10:
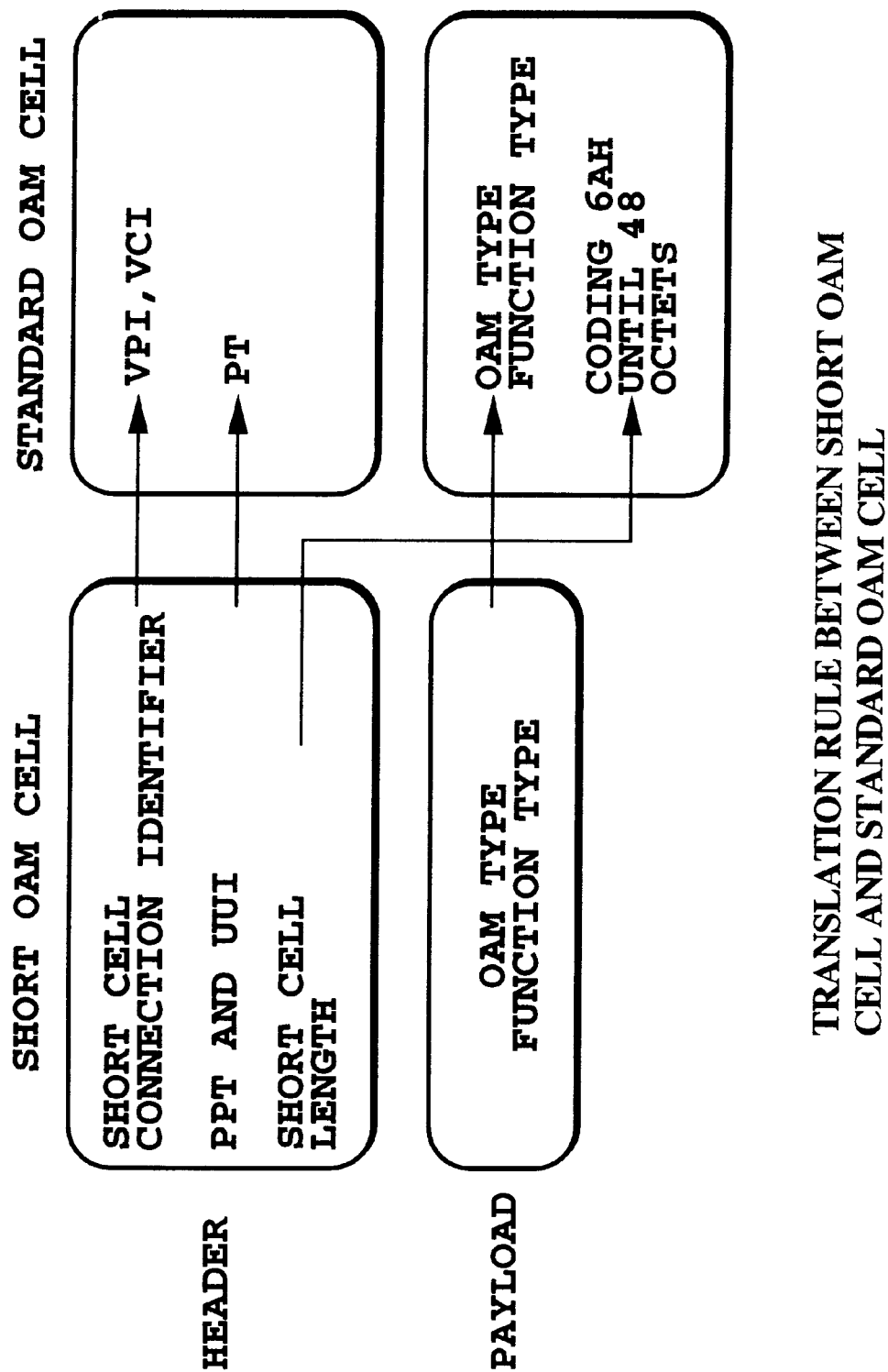
FIG. 10 is a diagram illustrating translation rules between the short OAM cell and standard OAM cell.

FIG. 10 is a diagram showing an example of the translation rules carried out by the short OAM cell/standard OAM cell translator 14B (see, FIG. 2). The example is characterized in that the short cell length is variable so that the free portion removed from the standard OAM cell can be regenerated in accordance with the short cell length in the header.

Alternatively, the short cell length of the short OAM cell varying depending on the OAM type and function type can be uniquely determined in advance so that the free portion like free octets is regenerated automatically regardless of the short cell length. To uniquely determined the length, the short OAM cell branching portion 11A may possess a list enumerating the OAM type, the functional types and short cell lengths, or values of the free information portions to be added.

Figure 11A:
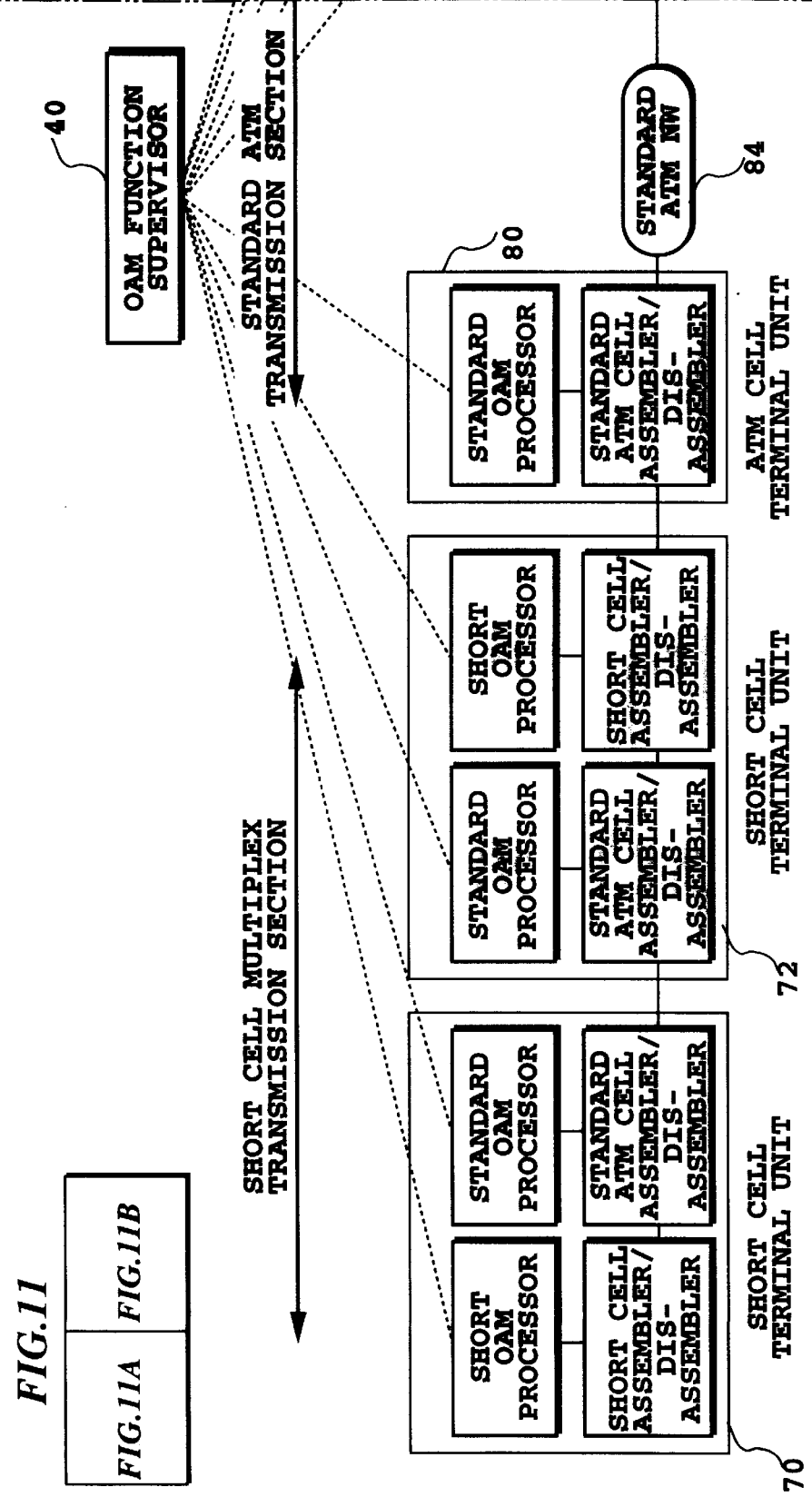
FIG. 11A is a block diagram illustrating operation of the OAM cell associated with F7 flow.
Figure 11B:
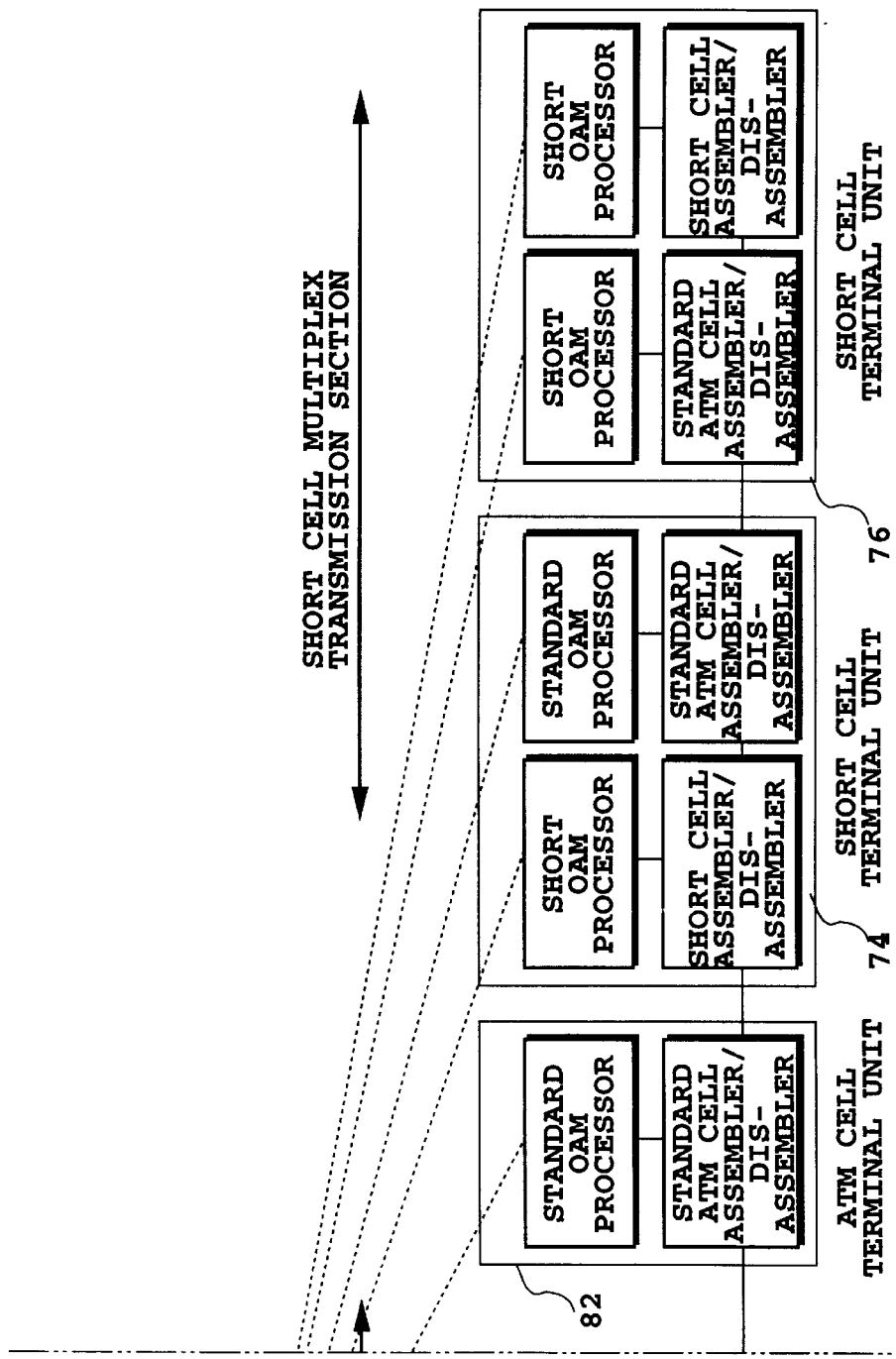
FIG. 11B is a block diagram illustrating operation of the OAM cell associated with F7 flow.

FIGS. 11A, 11B and 12 are diagrams illustrating the operation of the OAM cell associated with the F7 flow between the segments and from end to end in the case where short cell terminal units 70, 72, 74 and 76 and ATM cell terminal units 80 and 82 are connected in cascade. The segment flow freely determines a pair of terminal points of the units that can be used as connection nodes in the network, and carries out the OAM cell flow across the segments in the network. The end-to-end flow performs the OAM cell flow through the plurality of the connection nodes.

As shown in FIGS. 11A, 11B and 12, the end-to-end flow in the F7 flow is characterized in that although the OAM cells change their form in accordance with the mapping between the short OAM cell and the standard OAM cell, they can be managed as a single continuous flow. In addition, providing the short OAM processor (14 in FIG. 2, for example) with the standard OAM processor (14A in FIG. 2, for example) makes it easier for the short OAM cells to be matched to the standard ATM network.

Figure 13B:
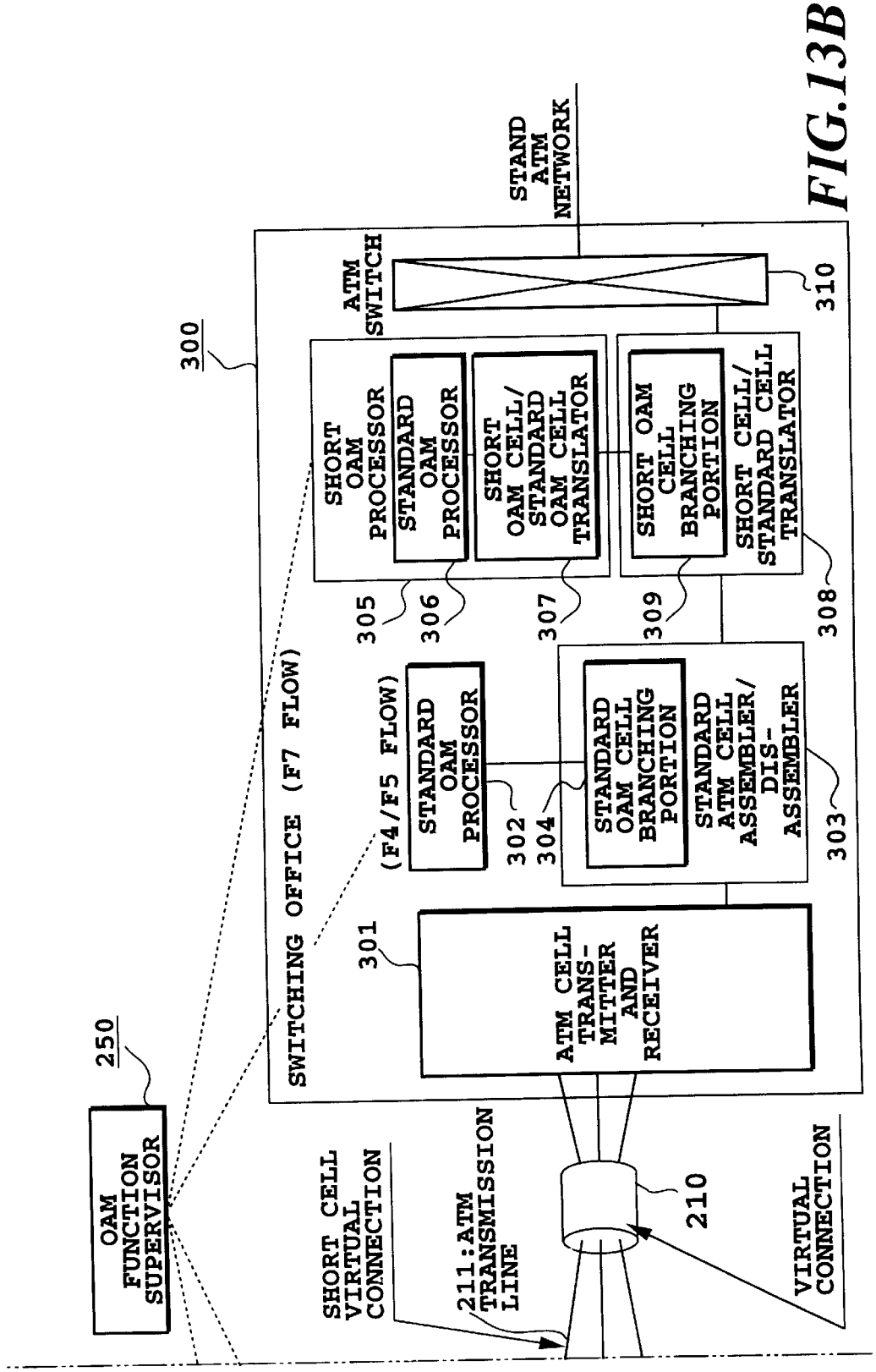
FIG. 13B is a block diagram illustrating a connection test to which the present invention is applied.
Figure 14A:
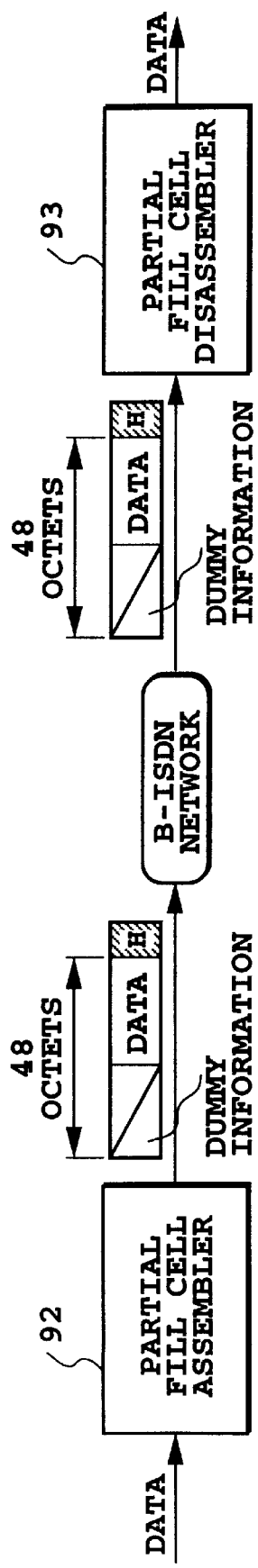
FIGS. 14A and 14B are block diagrams showing conventional techniques.
Figure 14B:
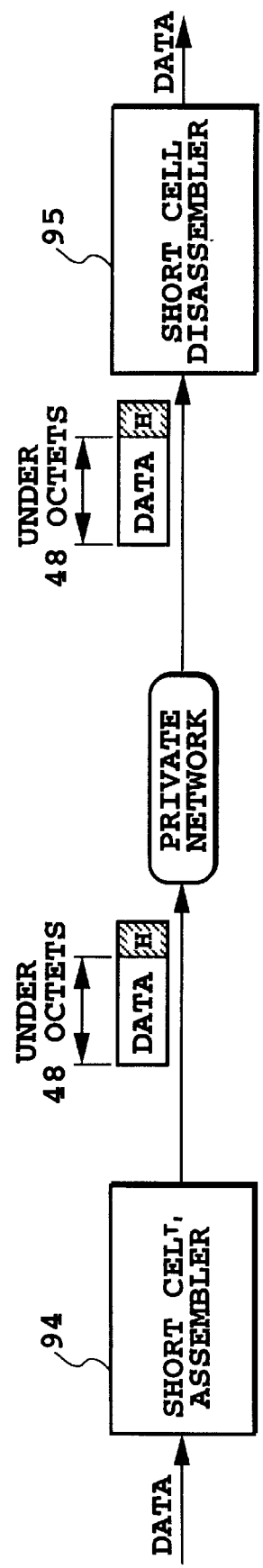
Figure 15B:
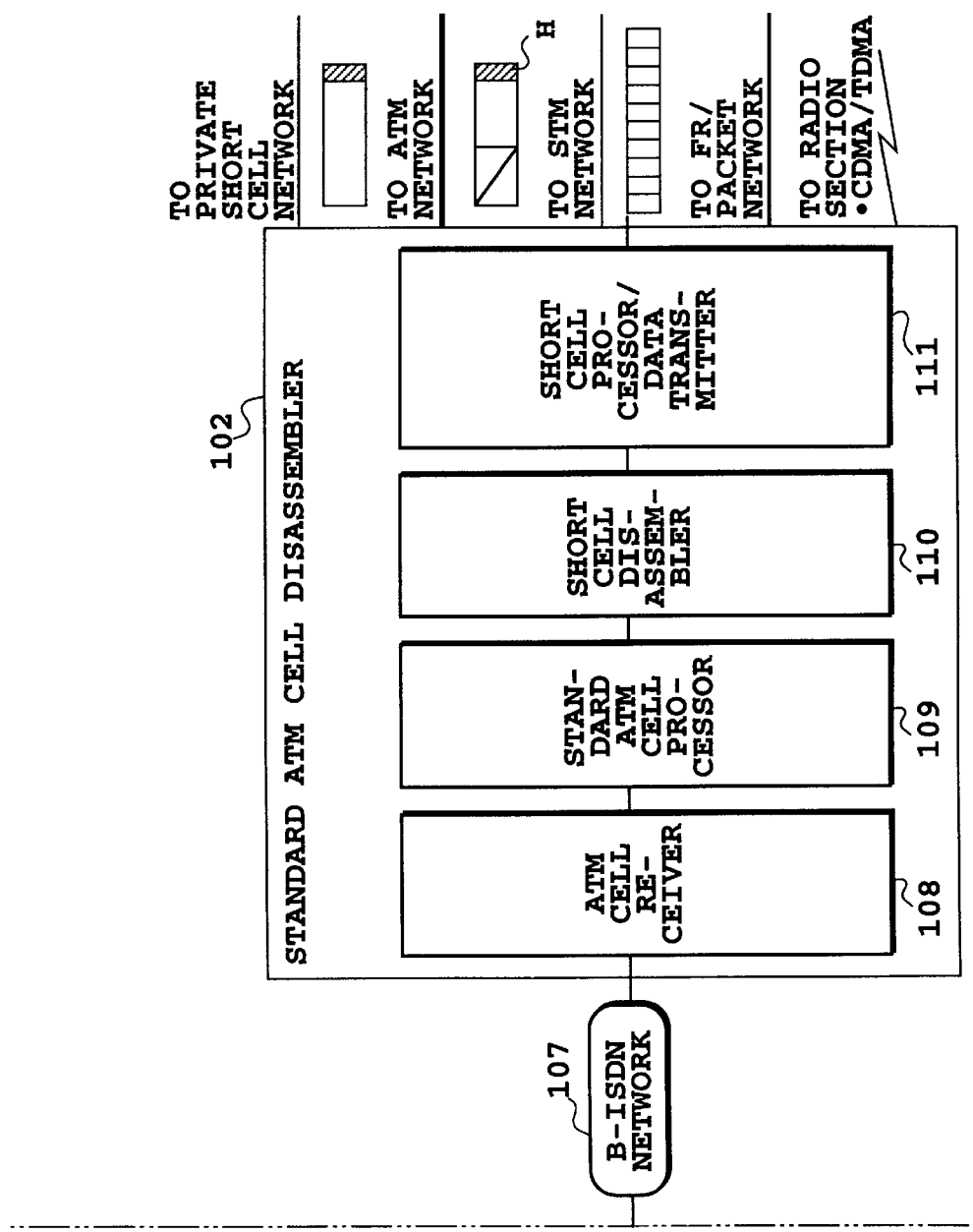
FIG. 15B are a block diagram showing a short cell multiplex ATM transmission technique as a prerequisite of the present invention.

Next, an example of the connection test procedure will be described with reference to FIGS. 13A and 13B. Here, let us assume that the short cell multiplex transmission is carried out between a base station and a switching office in the mobile communications network.

First, it is assumed that the connection used by a particular user is a short cell virtual connection SC1 211 in a virtual connection VC1 210. To confirm the connection of the SC1 211, an OAM function supervisor 250 commands a standard OAM processor 201 (F7 flow) in a base station 200 to generate a continuity check cell. In response to it, the standard OAM processor 201 in the short OAM processor 202 (F7 flow) generates the continuity check cell in the form of the standard OAM cell at regular intervals. The standard OAM cell is converted into the short OAM cell by the short OAM cell/standard OAM cell translator 203 using the method as shown in FIG. 10, and the short OAM cell is sent through a short cell assembler/disassembler 204 to a standard ATM cell assembler/disassembler 206, in which the short OAM cell is multiplexed in one or more standard ATM cells with other user cells to be sent to an ATM channel 210 through an ATM transmitter and receiver 209.

On the other hand, in a switching office 300, the short OAM cell multiplexed in the standard ATM cell is sent through an ATM cell transmitter and receiver 301 to a standard ATM cell assembler/disassembler 303 which extracts the short OAM cell. The extracted short OAM cell is separated from other user short cells by a short OAM cell branching portion 309 in accordance with the PPT and UUI in its header, and is fed to a short OAM cell/standard OAM cell translator 307 in a short OAM processor 305 (F7 flow). Here, a segment flow is described in the case where the PPT and UUI provide the description of the segment flow. In contrast, when the PPT and UUI provide the description of the end-to-end flow, the short OAM cell branching portion 309 makes a decision that the description is the end-to-end flow, and the short cell/standard cell translator 308 converts the short OAM cell to the standard OAM cell which is sent to the standard ATM network through an ATM switch 310. In this case, the connection from end to end can be confirmed.

The short OAM cell is converted to the standard OAM cell by the short OAM cell/standard OAM cell translator 307 in a procedure opposite to that of the base station, and is sent to a standard OAM processor 306. The continuity check cell in the form of the standard OAM cell is regularly extracted by the standard OAM processor 306 in the short OAM processor 305 (F7 flow) and the result is sent to the OAM function supervisor 250. If no continuity check cell is extracted, the OAM function supervisor 250 makes a decision that a failure occurs in somewhere.

In the procedures described above, the connection between the switching office and the base station or from end to end can be confirmed.

Although the above describes the connection test, other OAM functions such as fault detection, performance test can also be implemented by the F7 flow in similar procedures.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A short cell management unit in a short cell terminal unit included in a short cell multiplexing ATM transmission system which transmits a plurality of short cells multiplexed in a payload of a standard ATM cell, said short cell management unit comprising:

a short OAM cell branching portion for receiving short OAM cells, including OAM identifiers which show the OAM function type, detecting said OAM cells, and identifying whether the OAM cells is a short OAM cell; and a short OAM cell processor connected to said short OAM cell branching portion wherein the length of said short OAM cell is permitted to vary corresponding to the OAM function type; and wherein said short OAM processor includes:

a standard OAM processor; and a translator for carrying out translation between the short OAM cell and a standard OAM cell according to said length of the short OAM cell.

2. The short cell management unit as claimed in claim 1, wherein said short cell multiplexing ATM system further comprises an OAM function supervisor which transmits an OAM management command to said short OAM processor.

3. A short cell management method comprising, when carrying out short cell transmission by multiplexing a plurality of short cells in a payload of a standard ATM cell:

a first step of identifying a short OAM cell, including an OAM identifier which shows the OAM function type, detecting said OAM identifier, identifying and branching the short OAM cell to the short OAM processor; and a second step for branching and carrying out OAM processing of the received short OAM cell in a short OAM processor wherein the length of said short OAM cell is permitted to vary corresponding to the OAM function type.

4. The short cell management method as claimed in claim 3, wherein said second step comprising the steps of:

translating said short OAM cell received by said short OAM processor into a standard OAM cell; and carrying out the OAM processing according to the function shown by said translated standard OAM cell.

5. A short cell management unit in a short cell terminal unit included in a short cell multiplexing ATM transmission system which transmits a plurality of short cells multiplexed in a payload of a standard ATM cell, said short cell management unit comprising:

a short OAM processor receiving short OAM cells, including OAM identifier which shows the OAM function type, detecting said OAM cells, and identifying whether the OAM cells is a short OAM cell:

a short OAM cell processor for carrying out an OAM cell processing on the received short OAM cell wherein the length of said short OAM cell is permitted to vary corresponding to the OAM function type;

a standard OAM processor for carrying out an OAM function specified by said OAM identifiers; and a translator for carrying out translation between the short OAM cell and a standard OAM cell according to said length of the short OAM cell.

* * * * *